July 11, 1967
O. MANNING ET AL
3,330,294
REPLACEMENT VALVE
Filed Nov. 23, 1964
2 Sheets-Sheet 1
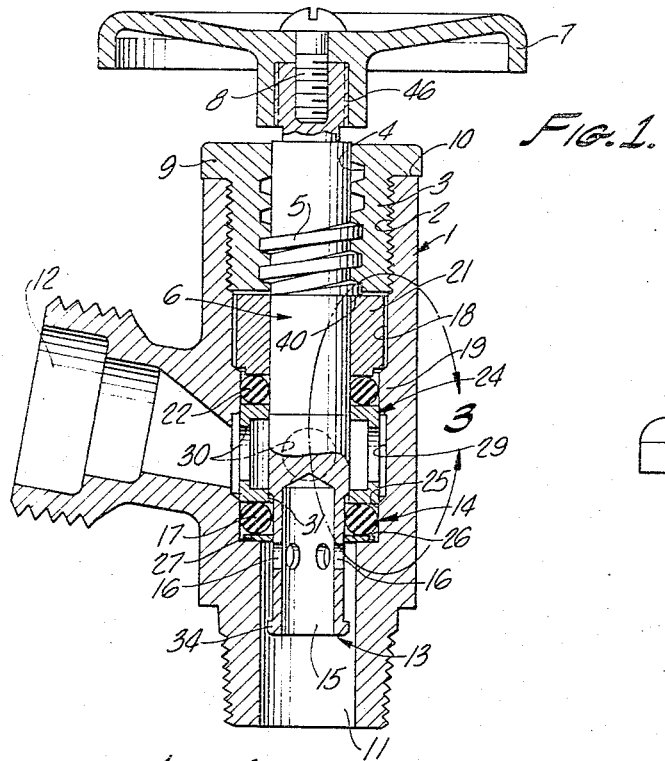
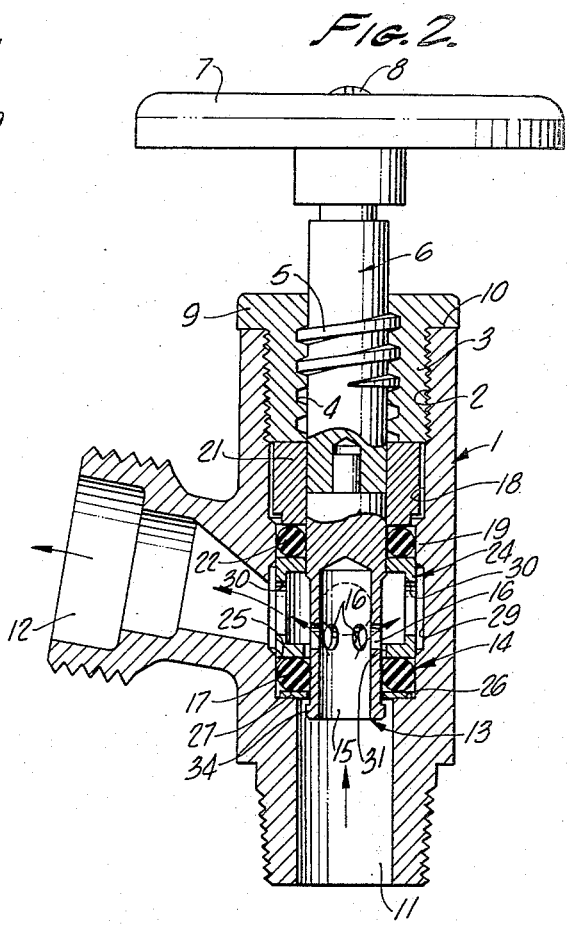
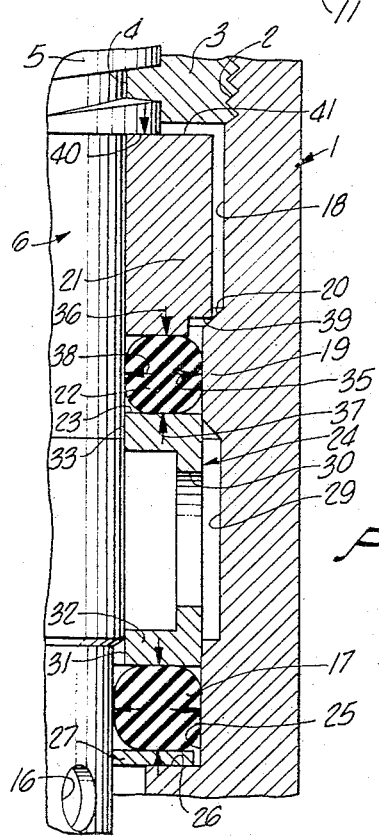
OSCAR MANNING
WILLIAM V. DRAPER
INVENTORS.
BY W. E. Beatty
ATTORNEY

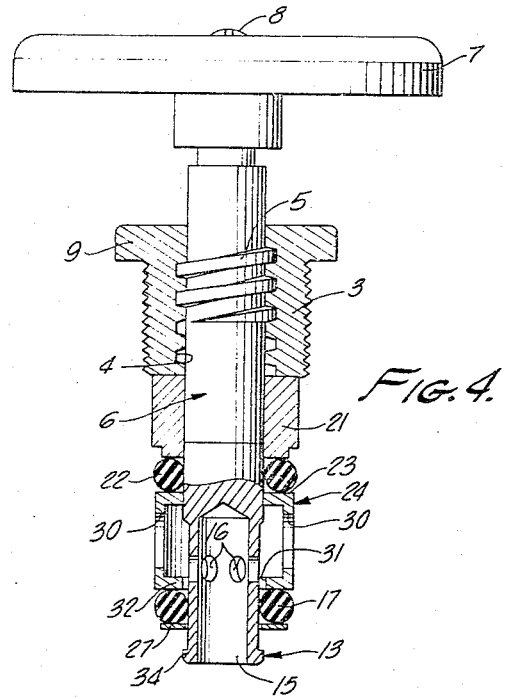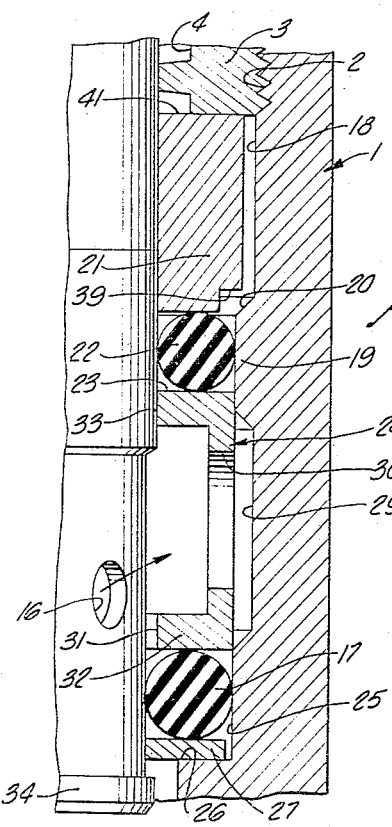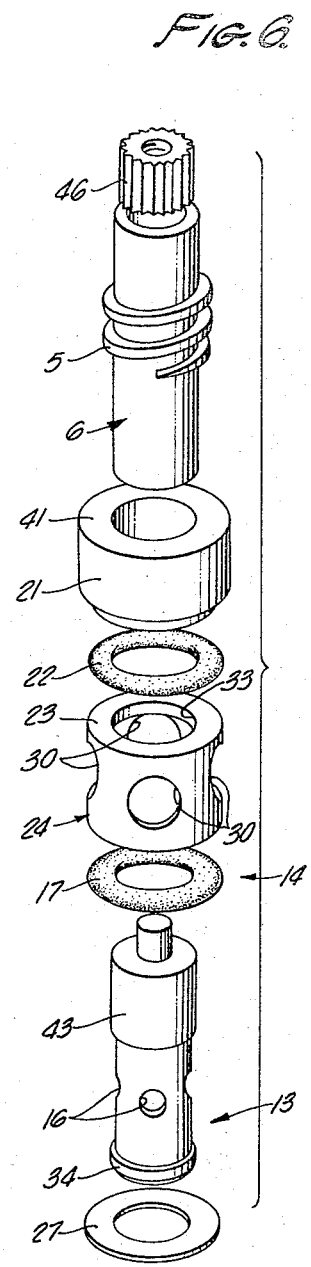

United States Patent Office 3,330,294
Patented July 11, 1967

3,330,294
REPLACEMENT VALVE
Oscar Manning, 13524 Hartland St., Van Nuys, Calif. 91405, and William V. Draper, Arleta, Calif. (153 E. Channel Island Blvd., Port Hueneme, Calif. 93041)
Filed Nov. 23, 1964, Ser. No. 413,128
3 Claims. (Cl. 137—315)

This invention relates to a replacement valve and more particularly, to improvements in the replacement valve of Patent 2,726,676, issued Dec. 13, 1955, to Oscar Manning.

Objects of the present invention are to simplify the installation and repair of the valve and to improve its operation.

These objects are accomplished as follows:

Installation and repair are simplified by mounting both the valve head and its relatively movable O ring seat, or similar sealing ring seat, on the valve stem as a unit, whereby the O rings are mounted on and carried by the valve stem for installation in or removal from a chamber in the valve casing. If it should be necessary to repair the unit by replacing the O rings, it is possible to do this without taking the component parts of the valve stem apart, the O rings having sufficient elasticity for removal from or installation on the valve stem.

The operation is improved by using the movement of the valve stem to vary the pressure on the sealing rings, this pressure having a reduced value during the opening and closing movements of the valve stem, such sealing pressure and the compression on the sealing rings being increased at the final closing movement of the valve stem.

For further details of the invention, reference may be made to the drawings wherein:

FIG. 1 is a vertical, sectional view of a replacement valve according to the present invention, the valve head being in position to shut off the flow.

FIG. 2 is a view corresponding to FIG. 1 with the valve stem in an alternate position, permitting flow through the valve.

FIG. 3 is an enlarged partial view of the valve of the other figures, showing the compression which is effected on the sealing rings when the closing movement of the valve stem is completed.

FIG. 4 is a view corresponding to FIG. 1 with the valve stem and associated parts removed from the casing of the other figures, showing the unit construction of the valve stem with its valve head and O ring seat.

FIG. 5 is an enlarged view corresponding to FIG. 3 showing the valve stem withdrawn to relieve compression on the sealing rings.

FIG. 6 is an enlarged exploded view of the valve stem and its associated parts.

Referring in detail to the drawings, the valve comprises a casing 1 having at its outer end an internally threaded bore 2 to receive a nut 3 having internal through threads 4 for the external threads 5 on a valve stem 6. The stem 6 at its outer end has fixed thereto a suitable handle 7 held in position by a screw 8. The nut 3 has an enlarged outer end 9 which overhangs the top 10 of the casing. The valve casing 1 has a fluid inlet 11 and an outlet 12 and the flow there between is controlled by the valve head 13 and cooperating seat 14. The valve head 13 is constituted by the open lower end 15 of the valve stem 6 having lateral ports indicated at 16. The ports 16 are out of communication with the outlet 12 when the valve is in the position shown in FIG. 1, with valve stem 6 extending inwardly, the fluid in inlet 11 being admitted to the interior of the open lower end 15 of valve stem 6, but being unable to flow therefrom to outlet 12. In the position shown in FIG. 12, where the stem 6 is elevated, the ports 16 are elevated to a position above the ring seal 17 which is bypassed at this time. Conjoining the threaded bore 2, the valve casing has a smooth bore 18, providing a chamber for follower 21, a walled portion 19 of reduced diameter providing a shoulder 20, which acts as a stop for shoulder 39 at the lower end of follower 21, to limit the downward movement of the follower 21 when the valve stem 6 is threaded into the valve casing to a position where the shoulder 40 at the lower face of thread 5 contacts the top 41 of follower 21 to urge the follower 21 downwardly to the position shown in FIG. 3 to increase the compression on and the sealing effect of the O rings 17 and 22. The portion 19 of reduced internal diameter provides a chamber for an upper O ring 22 which is located between the follower 21 and the top 22 of a cage 24. The cage 24 fits in the bore 25 in the valve casing, this bore portion terminating at its lower end as shown in FIGS. 1 and 2 in a shoulder 26. A washer 27 rests on the shoulder 26 and the O ring 17 is located between the top of washer 27 and the bottom 28 of the valve cage 24. The valve casing 1 has an enlarged bore 29 opposite the cage 24 to provide for flow of water completely around the cage on the way from the ports 16 to the outlet 12. The cage 24 has a number, such as four or six, equally spaced circular openings, or ports, as indicated at 30. The valve stem 6 extends loosely through the opening 31 in the lower wall 32 of the cage while the valve stem 6 slidingly fits in the opening 33 in the top wall of the cage.

The valve stem 6 at its lower end has an external shoulder 34 which underhangs the washer 27. Washer 27, with the O ring 22 and the follower 21, are all mounted on the valve stem 6 and removable with the valve stem as a unit, being insertable as a unit with the valve stem.

At the time that the valve stem with its sealing rings, cage, washer and follower thereon are inserted in position into the cylindrical bore 25 in the valve casing, the sealing rings 17 and 22 are free to some extent from compression, having a frictional fit in the bore 25. After the valve stem and its elements, above-named as a unit, are inserted in the valve casing, when valve stem 6 is moved from open position in FIG. 5 to and slightly beyond the closed position shown in FIG. 3, the shoulder 40 on thread 5 contacts the top 41 of follower 21, to increase the compression on the sealing rings 17 and 22, as explained above. Shoulder 40 bears on the follower 21 which compresses both of the sealing rings 17 and 22, thereby expanding them into sealing contact on four sides as shown in FIG. 3, wherein sealing ring 22 is shown by arrow 35 as being in sealing contact with and forced against the wall 19, arrow 36 showing the sealing contact between the sealing ring 22 and the bottom of the follower 21; arrow 37 showing the sealing contact between the top of the cage 24 and the sealing ring itself, and arrow 38 showing the sealing contact between the sealing ring and the valve stem 6.

The assembly, installation, repair and replacement, and operation are as follows:

*Assembly.*—As shown particularly in FIGS. 2 and 6, the valve stem 6 consists of two parts 42 and 43, which are force fitted together in alignment. For example, part 43 has a stud 44 which frictionally fits in a socket 45 in the valve stem part 42. Before securing these parts together, the washer 27 is slipped over the top of the part 43 and then the O ring 17 and cage 24 are mounted in position and the O ring 22 is placed on top of cage 24 and the follower 21 may be placed on the other part 42 and the parts 42 and 43 are securely fastened, or force fitted together, as described above.

*Installation.*—Before the handle 7 is mounted in position on the top of the valve stem, by force fitting it on the rough surface 46 in FIG. 6, the nut 3 is threaded into position on the threads 5. Thereafter, the valve stem with its attachments is mounted in the valve casing in an obvious manner, the nut 3 being threaded into position, as shown in the various figures.

*Repair and replacement.*—If the valve needs repair by reason of the fact that one of the O rings is damaged, or leaks, or becomes worn, the entire valve stem 6 with all of its attachments, as shown in FIG. 6, can be removed as a unit by unscrewing the nut 3. It is to be noted that the O rings 17 and 22 are quite elastic and hence, if it is desired to replace one or both of them, these O rings can be stretched enough to be removed from the valve stem and from the associated washer 27 and cage 24 simply by stretching them, without the necessity of removing the remaining parts from the valve stem. Such removal is, in fact, impossible, as such parts are located between, and will not pass, the shoulders 34 and 40. The new rings being similarly elastic are readily stretched and replaced as substitutes for the old O rings 17 and 22.

*Operation.*—The O ring 17 is slightly smaller in inside diameter than the upper O ring 22, to slidingly fit the outside of the lower end of the valve stem 6 which is of reduced diameter. When the valve is closed as shown in FIGS. 1 and 3, for example, the top of the ports like 16 is preferably below the lower O ring 17 and also below the washer 27. If the valve should leak at this time, the sealing effect of the O rings 17 and 22 can be increased, as above described, by continued downward movement of the valve steam, which increases the compression on these O rings, as described above.

Washer 27 acts as a backing to force all parts on the valve stem outwardly of the casing when the valve stem is pulled lengthwise out of the casing.

Various modifications may be made in the invention. For example, instead of reciprocating the valve stem by rotating it, using threads like 5, the valve stem may be reciprocated by a solenoid, or other means, as well known. Also, the valve may be used for various fluid pressures, including very high pressures of the order of 3 to 5 thousand pounds per square inch.

The sealing rings, like 17 and 22, may have a cross-sectional shape other than circular and use may accordingly be made of a quad ring or a square-cut washer.

We claim:

1. A valve comprising a valve head and cooperating relatively movable seat, said valve head being in the form of a hollow valve stem having a wall having a fluid opening communicating with a lateral port extending through said wall of said valve stem, said seat being in the form of a sealing ring for controlling flow through said lateral port, said sealing ring being mounted on and carried by the exterior of said valve head, in combination with a valve casing having an inlet and outlet for said valve stem and having a cylindrical bore in which said valve head and seat slidingly fit, means for retaining said seat in said casing, means for reciprocating said valve stem, and longitudinally-spaced shoulders at opposite sides of said sealing ring, one of said shoulders being at the inner end of said bore and the other shoulder being located on said valve stem, a follower for said sealing ring operated by said shoulder of said valve stem whereby longitudinal movement of said valve stem acts to vary the longitudinal compression on said sealing ring, said casing having a stop shoulder limiting inward movement of said valve stem, said securing means being removable, said valve stem having a shoulder at one side of said sealing ring for removing said sealing ring with said valve stem when said valve stem is removed from said casing.

2. A valve comprising a valve head and cooperating relatively movable seat, said valve head being in the form of a hollow valve stem having a wall and a fluid opening communicating with a lateral port extending through said wall of said valve stem, said seat being in the form of a sealing ring for controlling flow through said lateral port, said sealing ring being mounted on and carried by said valve head, a sealing ring seal on said valve stem, a cage slidably fitting on said valve stem, said sealing rings being located at opposite ends of said cage, said cage having ports providing an outlet when said lateral port in said valve head is between said sealing rings, a follower for said sealing ring seal, said valve stem having longitudinally-spaced shoulders, said follower, said cage and said sealing rings being mounted on said valve stem between its said shoulders.

3. A valve comprising a valve head and cooperating relatively movable seat, said valve head being in the form of a hollow valve stem having a wall and a fluid opening communicating with a lateral port extending through said wall of said valve stem, said seat being in the form of a sealing ring for controlling flow through said lateral port, said sealing ring being mounted on and carried by said valve head, a sealing ring seal on said valve stem, a cage slidably fitting on said valve stem, said sealing rings being located at opposite ends of said cage, said cage having ports providing an outlet when said lateral port in said valve head is between said sealing rings, a follower for said sealing ring seal, said valve stem having longitudinally-spaced shoulders, said follower, said cage and said sealing rings being mounted on said valve stem between its said shoulders, said sealing rings having sufficient elasticity for removal from said valve stem while said follower and said cage remain in situ on said valve stem.

References Cited

UNITED STATES PATENTS

| | | | |
|---|---|---|---|
| 1,103,120 | 7/1914 | Yarnall | 251—191 |
| 1,833,629 | 11/1931 | Yarnall | 251—191 |
| 3,166,097 | 1/1965 | Hinderer. | |

WILLIAM F. O'DEA, *Primary Examiner.*

HAROLD WEAKLEY, *Examiner.*